US007053737B2

(12) United States Patent
Schwartz et al.

(10) Patent No.: US 7,053,737 B2
(45) Date of Patent: May 30, 2006

(54) STRESS BIMORPH MEMS SWITCHES AND METHODS OF MAKING SAME

(75) Inventors: Robert N. Schwartz, Costa Mesa, CA (US); Ming Wu, Los Angeles, CA (US); Tsung-Yuan Hsu, Westlake Village, CA (US); Adele E. Schmitz, Newbury Park, CA (US); Robert Y. Loo, Agoura Hills, CA (US); James H. Schaffner, Chatsworth, CA (US); Gregory L. Tangonan, Oxnard, CA (US)

(73) Assignees: HRL Laboratories, LLC, Malibu, CA (US); The Regents of the University of California, Oakland, CA (US)

( * ) Notice: Subject to any disclaimer, the term of this patent is extended or adjusted under 35 U.S.C. 154(b) by 247 days.

(21) Appl. No.: 10/251,677

(22) Filed: Sep. 19, 2002

(65) Prior Publication Data

US 2003/0058069 A1 Mar. 27, 2003

Related U.S. Application Data

(60) Provisional application No. 60/324,244, filed on Sep. 21, 2001.

(51) Int. Cl.
*H01H 51/22* (2006.01)
(52) U.S. Cl. .......................... 335/78; 200/181
(58) Field of Classification Search .................. 335/78; 200/181; 361/257, 232, 233
See application file for complete search history.

(56) References Cited

U.S. PATENT DOCUMENTS 5,121,089 A   6/1992   Larson ....................... 333/107
5,367,136 A   11/1994  Buck ........................... 200/600
5,410,799 A   5/1995   Thomas ....................... 29/622
5,578,976 A * 11/1996  Yao ............................. 333/262
5,638,946 A * 6/1997   Zavracky .................... 200/181

(Continued)

FOREIGN PATENT DOCUMENTS

DE       44 37 261 C1   10/1995

(Continued)

OTHER PUBLICATIONS

Koester, D.A., et al., *MUMPs™ Design Handbook, Revision 4.0*, Cronos Integrated Microsystems, May 1999.

(Continued)

*Primary Examiner*—Lincoln Donovan
*Assistant Examiner*—Bernard Rojas
(74) *Attorney, Agent, or Firm*—Ladas & Parry LLP

(57) ABSTRACT

A micro-electromechanical system (MEMS) switch formed on a substrate, the switch comprising a transmission line formed on the substrate, a substrate electrostatic plate formed on the substrate, and an actuating portion. The actuating portion comprises a cantilever anchor formed on the substrate and a cantilevered actuator arm extending from the cantilever anchor. Attraction of the actuator arm toward the substrate brings an electrical contact into engagement with the portions of the transmission line separated by a gap, thus bridging the transmission line gap and closing the circuit. In order to maximize electrical isolation between the transmission line and the electrical contact in an OFF-state while maintaining a low actuation voltage, the actuator arm is bent such that the minimum separation distance between the transmission line and the electrical contact is equal to or greater than the maximum separation distance between the substrate electrostatic plate and arm electrostatic plate.

23 Claims, 7 Drawing Sheets

U.S. PATENT DOCUMENTS

| | | | | |
|---|---|---|---|---|
| 5,880,921 | A | | 3/1999 | Tham et al. ............... 361/233 |
| 6,046,659 | A | | 4/2000 | Loo et al. .................. 333/262 |
| 6,057,520 | A | * | 5/2000 | Goodwin-Johansson .... 200/181 |
| 6,127,908 | A | * | 10/2000 | Bozler et al. ............... 333/246 |
| 6,229,683 | B1 | * | 5/2001 | Goodwin-Johansson .... 361/233 |
| 6,229,684 | B1 | | 5/2001 | Cowen et al. .............. 361/278 |
| 6,236,491 | B1 | | 5/2001 | Goodwin-Johansson .... 359/291 |
| 6,307,452 | B1 | * | 10/2001 | Sun ............................ 333/262 |
| 6,331,257 | B1 | * | 12/2001 | Loo et al. ..................... 216/13 |
| 6,433,657 | B1 | * | 8/2002 | Chen .......................... 333/262 |
| 6,625,004 | B1 | * | 9/2003 | Musolf et al. .............. 361/278 |
| 6,646,215 | B1 | * | 11/2003 | Nelson ....................... 200/181 |
| 6,657,525 | B1 | * | 12/2003 | Dickens et al. .............. 335/78 |
| 2003/0132823 | A1 | * | 7/2003 | Hyman et al. ................ 335/78 |

FOREIGN PATENT DOCUMENTS

| | | |
|---|---|---|
| DE | 197 36 674 C1 | 11/1998 |
| WO | 99/43013 | 8/1999 |
| WO | 01/63634 A2 | 8/2001 |

OTHER PUBLICATIONS

Hurtós, E., et al., "Residual stress and texture in poly-SiC films grown by low-pressure organometallic chemical-vapor deposition," *Journal of Applied Physics*, vol. 87, No. 4, pp. 1748-1758 (Feb. 15, 2000).

Wu, M.C., et al., "Free-Space Integrated Optics Realized by Surface-Micromachining," *International Journal of High Speed Electronics and Systems*, vol. 8, No. 2, pp. 283-297 (1997).

Chang, C., et al., "Innovative micromachined microwave switch with very low insertion loss," *Sensors and Actuators A*, Elsevier Sequoia S.A., Lausanne, CH., vol. 79, No. 1, pp. 71-75 (Jan. 2000).

* cited by examiner

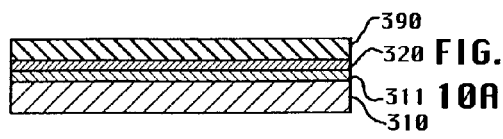
FIG. 10A
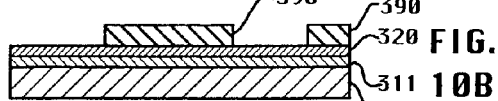
FIG. 10B
FIG. 10C
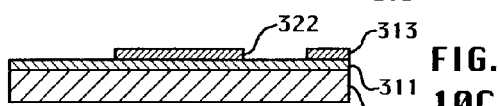
FIG. 10D
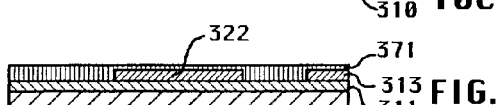
FIG. 10E
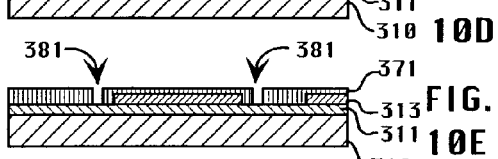
FIG. 10F
FIG. 10G
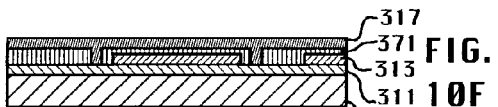
FIG. 10H
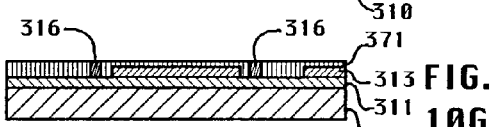
FIG. 10I
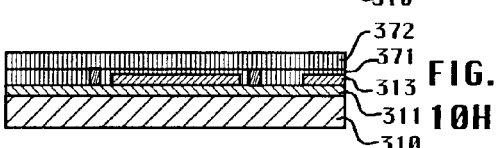
FIG. 10J
FIG. 10K
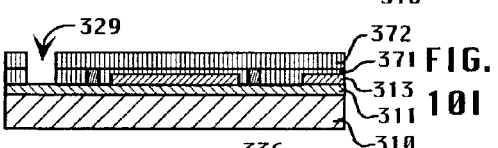
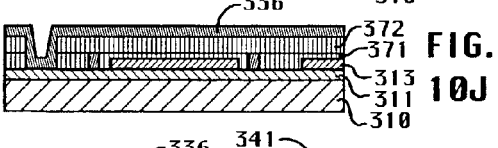
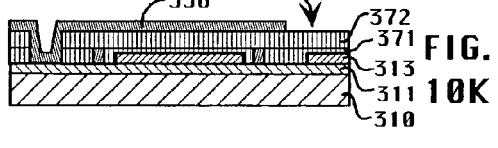
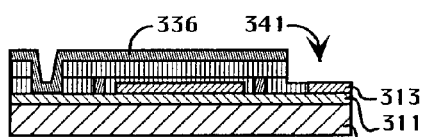
FIG. 10L
FIG. 10M
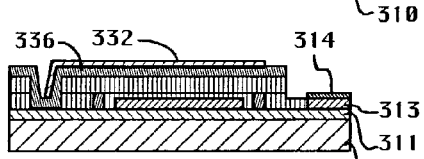
FIG. 10N
FIG. 10O
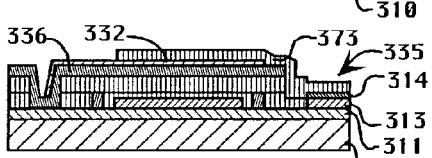
FIG. 10P
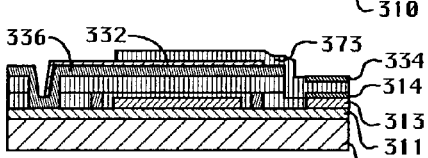
FIG. 10Q
FIG. 10R
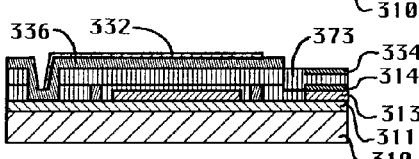
FIG. 10S
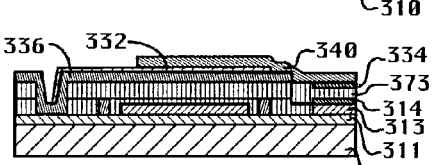
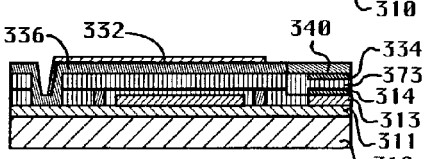
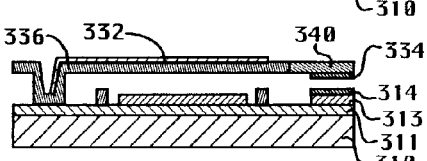
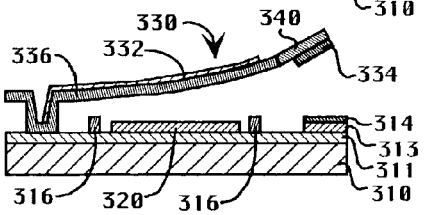
FIG. 10T

STRESS BIMORPH MEMS SWITCHES AND METHODS OF MAKING SAME

This application claims priority under 35 U.S.C. 119(e) to co-pending U.S. Patent Application No. 60/324,244 (filed on 21 Sep. 2001) entitled "STRESS BIMORPH RF MEMS SWITCHES," the contents of which are hereby expressly incorporated herein in their entirety by this reference.

BACKGROUND

1. Field

The present invention relates to micro-electromechanical systems (MEMS) and, in particular, to a micromachined electromechanical radio frequency (RF) switch that can preferably function over a range of signal frequencies from 0 Hz to approximately 100 GHz.

2. Description of Related Art

MEMS (micro-electromechanical system) switches have a wide variety of uses in both military and commercial applications. For example, electrostatically actuated micro-electromechanical switches can conduct RF current in applications involving the use of antenna phase shifters, in the tuning of reconfigurable antenna elements, and in the fabrication of tunable filters.

A representative example of a prior art MEMS switch is disclosed in Yao, U.S. Pat. No. 5,578,976, issued Nov. 26, 1996. Typically, this type of MEMS switch is fabricated on a semi-insulating substrate with a suspended micro-beam element as a cantilevered actuator arm. The cantilever arm is coupled to the substrate and extends parallel to the substrate, projecting over a ground line and a gapped signal line formed by metal microstrips on the substrate. A metal contact, preferably comprising a metal that does not easily oxidize, such as platinum, gold, or gold palladium, is formed on the bottom of the cantilever arm remote from the fixed end of the beam and positioned above and facing the gap in the signal line. A portion of the cantilever arm and an arm electrostatic plate located thereon reside above the ground line on the substrate. When a voltage is applied to the arm electrostatic plate, electrostatic forces attract the arm electrostatic plate, and thus the cantilever arm, toward the ground line on the substrate, bringing the metal contact into engagement with the separate portions of the gapped signal line, and thereby bridging the gap in the signal line.

Another example of an RF MEMS switch utilizing a cantilever actuator arm is disclosed in Loo et al., U.S. Pat. No. 6,046,659, issued Apr. 4, 2000. In Loo et al., the cantilever actuator arm comprises a multiple layer structure containing the arm electrostatic plate surrounded by insulating layers. As in Yao, the RF MEMS switch disclosed by Loo et al. provides a metal contact that bridges a gap between two portions of an RF signal line, when the switch is closed. Both Yao and Loo et al. disclose that the cantilever actuator arm is generally disposed parallel to the surface of the substrate when the RF MEMS switch is in the open position. Thus, the distance between the metal contact and the RF signal line when the RF MEMS switch is in the open position is limited to the distance between the cantilever actuator arm and the substrate along nearly the entire length of the cantilever actuator arm.

RF MEMS switches provide several advantages over conventional RF switches which use transistors. These advantages include lower insertion loss, improved electrical isolation over a broad frequency range, and lower power consumption. Since this type of switch is fabricated using existing integrated circuit (IC) processing technologies, production costs are relatively low. Thus, RF MEMS switches manufactured using micromachining techniques have advantages over conventional transistor-based RF switches because the MEMS switches function like macroscopic mechanical switches, but without the associated bulk and relatively high cost.

However, integrated RF MEMS switches are difficult to implement. Due to the proximity of the electrical contact formed on the cantilever arm to the signal line formed on the substrate, these switches tend to exhibit poor electrical isolation at high frequencies. In the RF regime, close proximity of the electrical contact and the signal line allows parasitic capacitive coupling between the contact and signal line when the switch is in the OFF-state, creating an AC leakage path for high frequency signals. These losses, which increase with signal frequency, limit the use of MEMS switches in high frequency applications.

Capacitive coupling may be reduced by increasing the separation distance between the signal line formed on the substrate and the metal contact formed on the cantilever arm. However, in the MEMS switch described above, there is a design tradeoff between the OFF-state capacitance and the switch actuation voltage. This tradeoff can be expressed mathematically. The OFF-state capacitance of the switch is given by the relation:

$$C_{OFF} = \frac{\varepsilon \varepsilon_0 A}{d} \quad (1)$$

where A is the area of overlap between the contact and the signal line, d is the distance between the contact and the signal line, $e_0$ is the permittivity of free space and e is the dielectric constant of the material between the contact and the signal line.

The actuation voltage of a cantilever beam in a switch as described above can be approximated by:

$$V_S^1 \approx \sqrt{\frac{18 E I d^3}{5 \varepsilon \varepsilon_0 L^4 w}} \quad (2)$$

where E is Young's modulus of the beam material, I is the moment of inertia of the beam cross-section, and L and w are the length and width of the cantilever beam, respectively. For a cantilever beam with a uniform width w, and a thickness t, the moment of inertia is given by:

$$I = \frac{t^3 w}{12} \quad (3)$$

and $V_S$ can be simplified to:

$$V_S = \sqrt{\frac{3 E (dt)^3}{10 \varepsilon \varepsilon_0 L^4}} \quad (4)$$

Combining the above expressions (1) and (4) yields $$C_{OFF} \propto V_S^{-2/3} \quad (5)$$

Thus, in the RF MEMS switches of the type described above, increasing the separation distance between the signal line formed on the substrate and the electrical contact formed on the cantilever arm also increases the voltage required to affect electrostatic actuation of the switch, because the separation distance between the signal line and the contact is also the separation distance between the arm electrostatic plate and the ground line. The energy that must be moved through the switch control in order to activate the switch, and thus the energy dissipated by the switch, is a function of the actuation voltage. Therefore, in order to minimize the energy dissipated by the RF MEMS switch, it is desirable to minimize the actuation voltage of the switch.

Another problem with the conventional cantilever switch described above stems from the methods used to manufacture the switch. A polycrystalline silicon (or polysilicon) cantilever beam can be fabricated by first oxidizing a silicon substrate to provide a sacrificial layer, then depositing and patterning a layer of polysilicon into a long, narrow bar directly over the silicon dioxide. The beam is then separated from the sacrificial silicon dioxide layer by application of a release agent comprising a hydrofluoric acid solution, which dissolves the sacrificial layer and results in a free-standing polysilicon beam spaced apart from the substrate. The substrate is immersed in the release agent for a duration sufficient to result in release of the beam. One problem with the use of this release process for a beam in relatively close proximity to the substrate is that surface tension forces exerted by the release agent tend to pull the beam toward the substrate as the device is immersed in and pulled out of the solutions. This can cause the beam to stick to the substrate during drying, a phenomenon known as stiction.

In view of the foregoing, there is a need for a microelectromechanical switch having improved electrical isolation and improved manufacturability, without requiring a corresponding increase in actuation voltage.

SUMMARY

Embodiments of electromechanical switches according to the present invention minimize the OFF-state capacitance of the electrostatically actuatable micro-electromechanical switch formed on a substrate, without a corresponding increase in the voltage required to actuate the switch. Embodiments of the present invention achieve minimization of the OFF-state capacitance by utilizing an actuator arm bent such that the minimum separation distance between an electrical contact formed on the actuator arm and a transmission line formed on the substrate is equal to or greater than the maximum separation distance between a substrate electrostatic plate formed on the substrate and an arm electrostatic plate formed on the actuator arm. The bilaminar cantilever structure of the preferred embodiments enable a large separation (up to approximately 300 micrometers) to be achieved between the transmission line formed on the substrate and the electrical contact formed on the actuator arm, while maintaining a very low actuation voltage (approximately 20 V). This large separation can be used to reduce the capacitance of the RF MEMS switch in the OFF state, thus providing high isolation at high frequencies.

The desired minimization of the OFF-state capacitance is achieved without a corresponding increase in the actuation voltage by forming the arm electrostatic plate at a point on the actuator arm that allows the distance between the arm electrostatic plate, formed on the actuator arm, and the substrate electrostatic plate, formed on the substrate, to be precisely and repeatably controlled, thus allowing the actuation voltage to be correspondingly controlled.

The tendency of the beam to stick to the substrate during drying is reduced by forming the bend in the actuator arm through the generation of unbalanced residual stresses in either the polycrystalline silicon comprising the actuator arm or the metallic layer formed on the actuator arm, this metallic layer comprising the arm electrostatic plate. The unbalanced residual stresses can be generated by manipulation of deposition process parameters during formation of the actuator arm structure. Due to these residual stresses in the actuator arm structure, the actuator arm is in a stressed condition prior to release from the sacrificial layer and will tend to bend away from the substrate when released. This counters the tendency of the arm to deflect toward the substrate in response to surface tension forces exerted by the release solution.

A general embodiment of the electromechanical switches according to the present invention has a cantilevered actuator arm which has an electrostatic plate disposed above an electrostatic plate positioned on a substrate. The switch is open and closed by the electrostatic attraction between the plates. In the open position, the cantilevered arm curves away from the substrate. Switching is provided by a gapped transmission line positioned on the substrate at one end of the cantilevered arm. The arm carries an electrical contact that bridges the gap when the switch is in the closed position. The electrical contact may simply be a region of metal or other electrically conducting material attached to the arm. The electrical contact may also comprise electrically conducting material that projects through the arm to contact the gapped transmission line when the switch is closed. The electrical contact may also be electrically isolated from the arm by a layer of insulating material disposed at the end of the arm. The arm may also be electrically isolated from the electrostatic plate on the substrate when the switch is closed by mechanical stops disposed next to the electrostatic plate that prevent the arm from contacting the plate.

Embodiments of the switches according to the present invention may be fabricated by well-known integrated circuit fabrication processes. Generally, The processes also involve applying one or more layers of sacrificial material. These layers of sacrificial material support the fabrication of the desired structures for the switch. Other processes involve applying one or more layers of electrically conductive material to form the electrically conductive elements, such as the electrostatic plates and electrical contact. As briefly noted above, it is desired that the actuating arm of the cantilever structure according to the present invention be fabricated such that it curls or curves upwards when the switch is open. Processes used to obtain this result are described below.

An aspect of the present invention comprises: a substrate; a first electrical contact formed on the substrate; a substrate electrostatic plate formed on the substrate; a cantilever actuator arm anchored to the substrate at a first end of the actuator arm; a second electrical contact disposed at a second end of the actuator arm, the second electrical contact being in electrically contact with the first electrical contact when the switch is in a closed position; the substrate electrostatic plate disposed beneath the actuator arm and between the first end and the second end of the actuator arm; and an arm electrostatic plate formed on the actuator arm and positioned above the substrate electrostatic plate when the switch is in a closed position, wherein when the switch is in an open position, the actuator arm curves away from the substrate.

Another embodiment of the present invention also provides a method for switching electrical energy comprising providing an electrostatically actuated cantilevered arm on a substrate; applying a voltage to attract the electrostatically actuated cantilevered arm towards the substrate, the cantilevered arm having an electrical contact that electrically connects the input to the output when the voltage is applied; and removing the voltage or applying a second voltage to cause the cantilevered arm to move away from the substrate, the electrical contact no longer electrically connecting the input to the output when the voltage is removed or the second voltage is applied, such that the cantilevered arm curves away from the substrate when the voltage is removed or the second voltage is applied.

BRIEF DESCRIPTION OF THE DRAWINGS

FIGS. 10A–10T are side views of the switch of FIGS. 8 and 9, illustrating the steps in fabricating the switch.

DETAILED DESCRIPTION OF THE PREFERRED EMBODIMENTS

The present disclosure describes a miniature RF switch designed for applications over a frequency range from DC to approximately 100 GHz. The following disclosure describes an RF MEMS switch according to the present invention fabricated on a silicon-based substrate. However, RF MEMS switches according to the present invention may also be fabricated from various other substrate materials, such as gallium arsenide (GaAs), glass, and other dielectrics.

Figure 1:
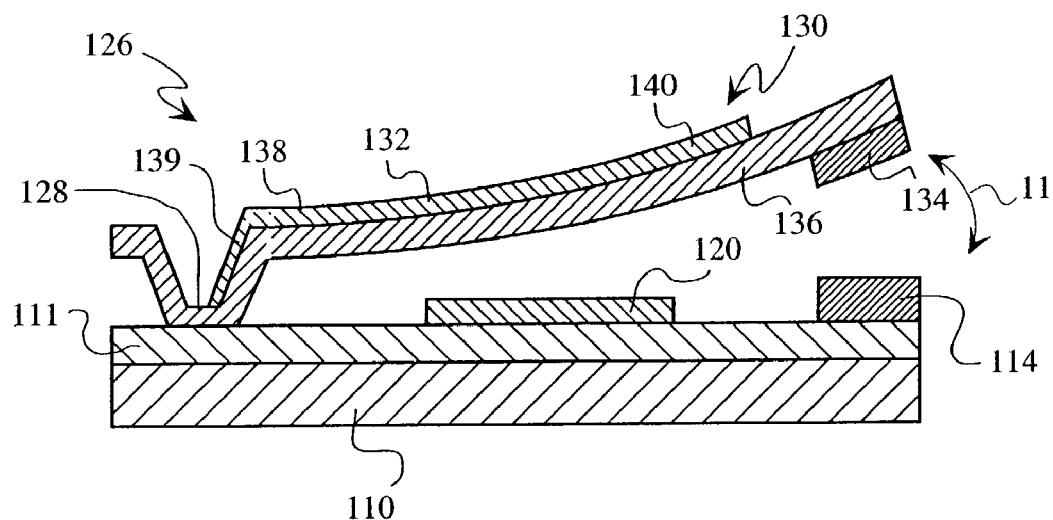
FIG. 1 is a side view of the cantilever beam and contact arrangement of an RF MEMS switch according to a preferred embodiment of the present invention, showing the switch in the open position.
Figure 2:
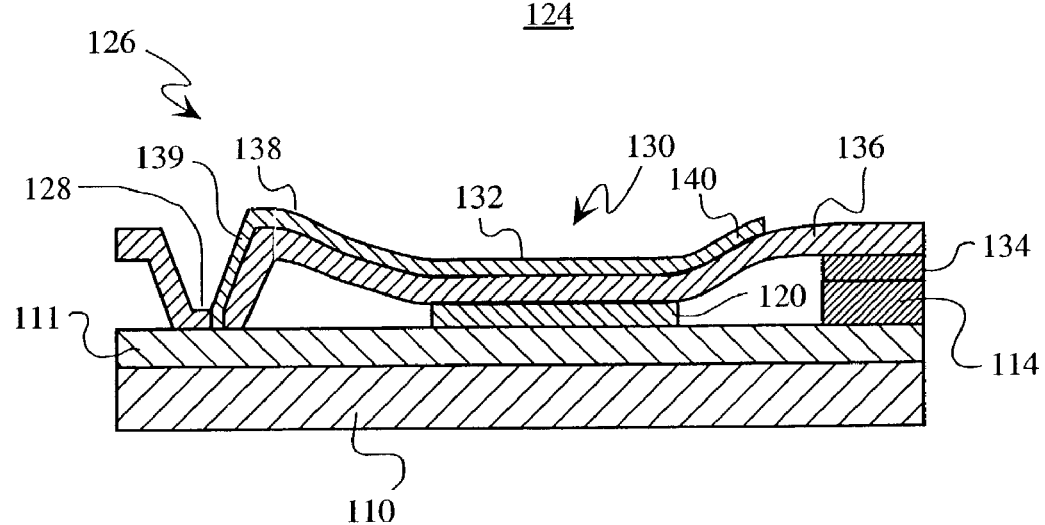
FIG. 2 is a side view similar to FIG. 1 showing the switch in the closed position.
Figure 3:
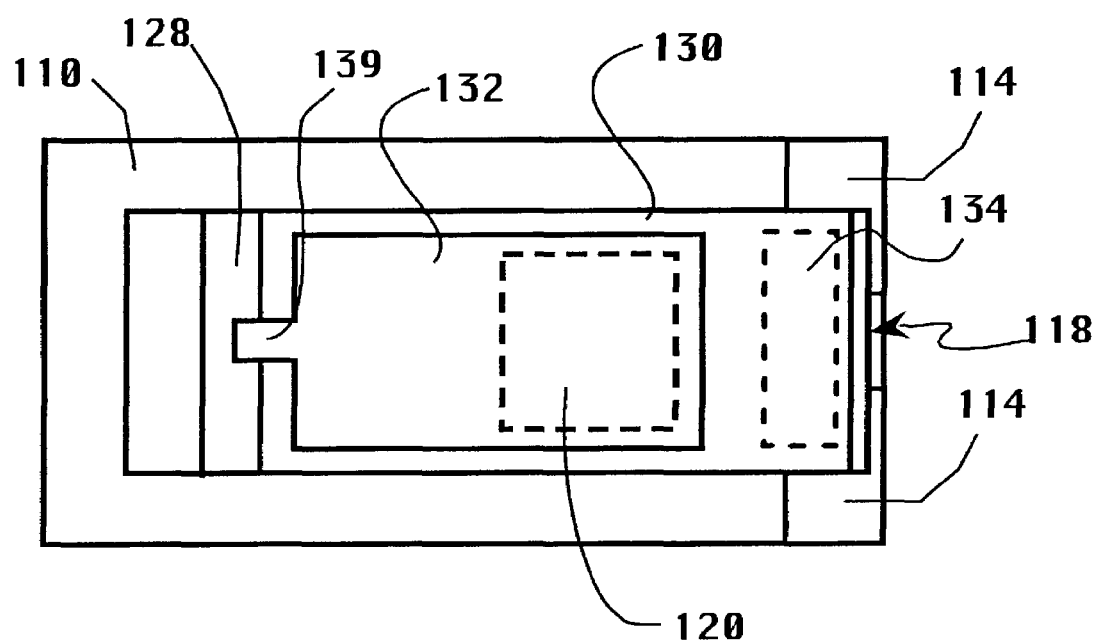
FIG. 3 is a plan view of the switch of FIG. 1 in the open position.

In a preferred embodiment, a micro-electromechanical switch, generally designated 124 and best illustrated in FIGS. 1, 2 and 3, is fabricated on a substrate 110 using generally known microfabrication techniques, such as masking, etching, deposition, and lift-off. In a preferred embodiment, the RF MEMS switch 124 is directly formed on the substrate 110 and monolithically integrated with a transmission line 114. Alternatively, the RF MEMS switch 124 may be discreetly formed and then bonded to the substrate 110. The switch 124 comprises the transmission line 114, a substrate electrostatic plate 120, an actuating portion 126, and an electrical contact 134. The substrate electrostatic plate 120 (typically connected to ground) and the transmission line 114 are formed on the substrate 110. An insulating layer 111 may be used to electrically isolate the transmission line 114, the substrate electrostatic plate 120, and the actuating portion 126 from the substrate 110. The substrate electrostatic plate 120 and the transmission line 114 preferably comprise microstrips of a metal not easily oxidized, e.g., gold, deposited or otherwise formed on the substrate 110. The transmission line 114 includes a gap 118 (shown in FIG. 3) that is opened and closed by operation of the switch 124, in a manner explained below.

The actuating portion 126 of the switch 124 comprises a cantilever anchor 128 formed on the substrate 110, and a cantilevered actuator arm 130 extending from cantilever anchor 128. The actuator arm 130 forms a suspended micro-beam projecting from one end at the cantilever anchor 128 and extending over and above the substrate electrostatic plate 120 and the transmission line 114 on the substrate 110.

The actuator arm 130 has a bilaminar cantilever (or bimorph) structure, that is, the structure comprises two dissimilar materials, preferably with different residual stresses, layered together. Due to its mechanical properties, the bimorph structure exhibits a very high ratio of displacement to actuation voltage. That is, a relatively large displacement (approximately 300 micrometers) can be produced in the bimorph cantilever in response to a relatively low switching voltage (approximately 20 V). A first layer 136 of the actuator arm 130 preferably comprises a semi-insulating or insulating material, such as polycrystalline silicon. A second layer 132 of the actuating arm 130 preferably comprises a metal film (typically aluminum or gold) deposited atop first layer 136.

As shown in FIG. 1, the second layer 132 comprises a first portion 138 formed proximate the cantilever anchor 128 and a second portion 140 extending from the first portion 138 toward the position on the actuator arm 130 at which the electrical contact 134 is formed. The second portion 140 typically acts as an arm electrostatic plate 140 during operation of the switch 124. In the remainder of the description, the terms "second layer" and "arm electrostatic plate" will be used interchangeably. A third portion 139 of the second layer 132 may be formed within or on the cantilever anchor 128 to provide an electrical connection to the second layer 132. At least a portion of the arm electrostatic plate 140 and a corresponding portion of the actuator arm 130 on which the arm electrostatic plate 140 is formed are positioned above the substrate electrostatic plate 120 to form an electrostatically actuatable structure. The height of the cantilever anchor 128 and the first layer 136 above the substrate 110 can be tightly controlled using known fabrication methods. Forming the arm electrostatic plate 140 on top of the first layer 136 allows a correspondingly high degree of control over the height of the arm electrostatic plate 140 above the substrate electrostatic plate 120. As the switch actuation voltage is dependent upon the distance between the substrate electrostatic plate 120 and the arm electrostatic plate 140, a high degree of control over the spacing between the electrostatic plates 120, 140 is preferred in order to repeatably achieve a desired actuation voltage.

The electrical contact 134, typically comprising a metal that does not easily oxidize, e.g., gold, platinum, or gold palladium, is formed on the actuator arm 130 and positioned on the arm 130 so as to face the gap 118 formed in the transmission line 114. When the switch 124 is in the closed position, the electrical contact 134 bridges the gap 118 and provides an electrical connection between the two portions of the transmission line 114.

To achieve a low actuation voltage without sacrificing electrical isolation in the OFF-state (or open switch state), the actuator arm 130 is formed so it bends or curls upwards and away from the substrate 110. Preferably, the upwards curl in the actuator arm 130 is such that the minimum separation distance between the transmission line 114 and the electrical contact 134 formed on the actuator arm 130 is equal to or greater than the maximum separation distance between the substrate electrostatic plate 120 and the arm electrostatic plate 140 when the switch 124 is in the open position. The upwards curl in the actuator arm 130 is caused by nonuniform residual stresses induced in the material comprising the first layer 136 of the actuator arm 130, the second layer 132, or both layers 132, 136 during the fabrication of those layers. Alternatively, the curve in the actuator arm may be induced by using materials with different residual stresses for the first layer 136 and the second layer 132 of the actuator arm 130. The different residual stresses may result from different properties of the first layer 136 and the second layer 132, such as different coefficients of thermal expansion.

The operation of the preferred embodiment will now be discussed with reference to FIGS. 1–3. In operation, the switch 124 is normally in an open or "OFF" position as shown in FIG. 1. With the switch 124 in the OFF-state, the transmission line 114 is an open circuit due to both the gap 118 and the separation of the electrical contact 134 from the transmission line 114.

The switch 124 is actuated to the closed or "ON" position by application of a voltage between the arm electrostatic plate 140 and the substrate electrostatic plate 120. When the voltage is applied, the arm electrostatic plate 140 is electrostatically attracted toward the substrate electrostatic plate 120, forcing the actuator arm 130 to deflect toward the substrate 110. Deflection of the actuator arm 130 toward the substrate electrostatic plate 120, as indicated by double-headed arrow 11 in FIG. 1, causes the electrical contact 134 to come into contact with the transmission line 114, thereby bridging the gap 118 and placing the transmission line 114 in an ON-state (i.e., closing the circuit). As previously explained, the arm electrostatic plate 140 is formed at a point on the actuator arm 130, (for example, adjacent the cantilever anchor 128) which allows the distance between the arm electrostatic plate 140 and the substrate electrostatic plate 120 formed on the substrate 110 to be precisely and repeatably controlled using standard photolithographic processes.

Furthermore, in the "OFF" or open state, the actuator arm 130 curls upwards so that the minimum separation distance between the transmission line 114 and the electrical contact 134 formed on the actuator arm 130 is preferably equal to or greater than the maximum separation distance between the substrate electrostatic plate 120 and the arm electrostatic plate 140. Thus, the distance between the electrical contact 134 and the transmission line 114 formed on the substrate 110 is greater than the corresponding spacing characteristic of conventional MEMS cantilever-type switches (such as those disclosed by Yao and Loo et al., as discussed previously). As a result, the OFF-state capacitance of the switch is greatly reduced.

The actuation voltage required to close the switch 124 is primarily determined by the distance between the substrate electrostatic plate 120 and the portion of the arm electrostatic plate 140 disposed closest to the substrate electrostatic plate 120. Since the distance separating the arm electrostatic plate 140 and the substrate electrostatic plate 120 formed on the substrate 110 is precisely and repeatably controlled, the voltage required to cause the actuator arm 130 to snap down can be correspondingly controlled and minimized to maintain a relatively low actuation voltage. Further, due to the curl of the actuator arm 130, a zipper-like actuation motion is produced upon application of the actuation voltage. That is, the end of the arm electrostatic plate 140 closest to the cantilever anchor 128 will initially be attracted towards the substrate electrostatic plate 120. The motion of this end towards the substrate electrostatic plate 120 will decrease the distance of the remainder of the arm electrostatic plate 140 from the substrate electrostatic plate 120, which further decreases the voltage required to close the switch 124. Therefore, the overall motion of the actuator arm 130 as it moves towards the substrate electrostatic plate 120 appears much like the motion of a zipper as it is closed.

Embodiments of the present invention provide the important advantage of reduced OFF-state capacitance without a corresponding increase in actuation voltage. Thus, the actuation voltage and the RF performance of the switches according to the present invention can be separately optimized.

One possible method of fabricating the switch 124 will now be described. The switch 124 may be manufactured using generally known microfabrication techniques, such as masking, etching, deposition, and lift-off. For example, the switch 124 may be fabricated using a foundry-based polysilicon surface-micromachining process, or a metal/insulator surface-micromachining process. The substrate 110 for one preferred embodiment may be a semi-insulating GaAs wafer, although other materials such as InP, ceramics, quartz or silicon may be used. Polycrystalline silicon deposited using plasma enhanced chemical vapor deposition may be used as the preferred structural material for cantilever anchor 128 and actuator arm 130, and silicon dioxide may be used as sacrificial material, as described below.

Figure 4A:
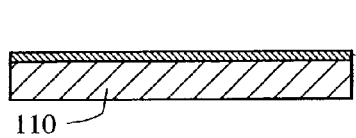
FIGS. 4A–N are side views of the switch of FIG. 1 illustrating the steps in fabricating the switch.
Figure 4B:
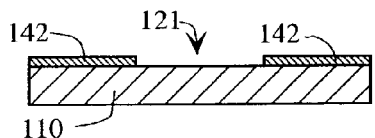
Figure 4C:
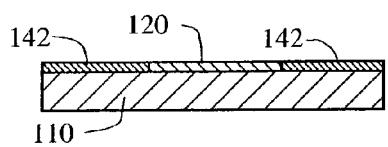
Figure 4D:
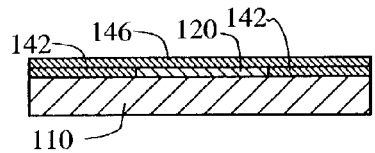
Figure 4E:
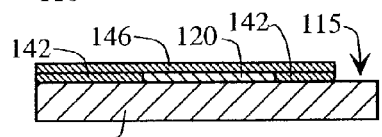
Figure 4F:
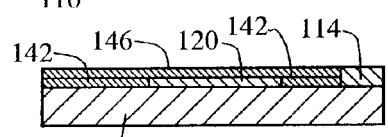
Figure 4G:
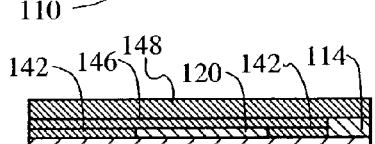
Figure 4H:
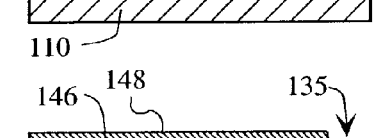
Figure 4I:
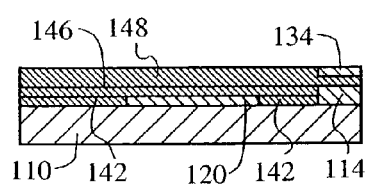
Figure 4J:
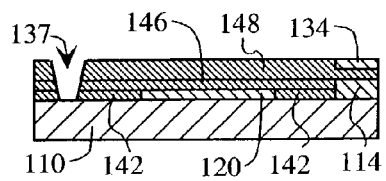
Figure 4K:
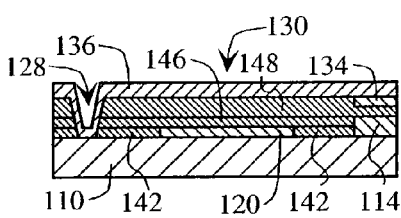
Figure 4L:
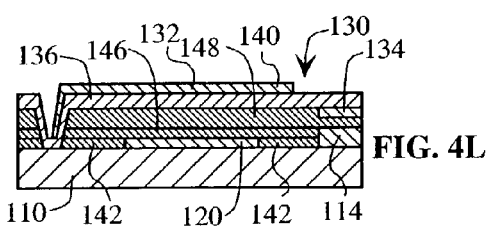
Figure 4M:
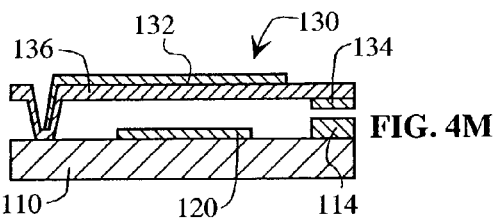
Figure 4N:
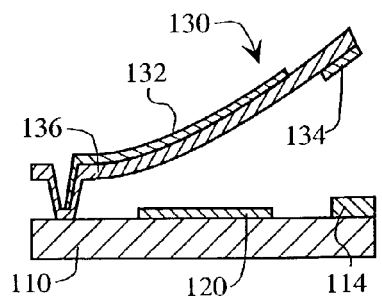

FIGS. 4A–N are side view schematic illustrations of a process sequence that may be used to fabricate the switch 124 illustrated in FIGS. 1–3. Note that the insulating layer 111 is not shown in FIGS. 4A–N, but alternative fabrication processes may include this feature. Note also that the switch 124 may be fabricated by processes other than those depicted in FIGS. 4A–N. Further, while FIGS. 4A–N depict multiple separate fabrication steps, alternative fabrication processes may allow several separate steps to be combined into fewer steps. Finally, alternative fabrication processes may use a different sequence of steps.

The fabrication of the switch 124 may begin with the fabrication of the substrate electrostatic plate 120. Prior to forming the substrate electrostatic plate 120, a first layer 142 of sacrificial material, such as silicon dioxide, is formed on the substrate 110, as shown in FIG. 4A. A hole 121 is then etched in the first sacrificial layer 142 to accommodate the substrate electrostatic plate 120, as shown in FIG. 4B. A first layer of gold (or other conductor) is preferably deposited using electron beam evaporation and liftoff to form the substrate electrostatic plate 120, as shown in FIG. 4C.

The gapped transmission line 114 may then be formed. A second layer 146 of sacrificial material, such as silicon dioxide, is deposited, as shown in FIG. 4D. A hole 115 at one side of the switch 124 is then etched through the first sacrificial layer 142 and the second sacrificial layer 146 for a first portion of the transmission line 114, as shown in FIG. 4E. A corresponding hole (not shown in FIGS. 4A–4N) on the other side of the switch 124 is also etched through the first sacrificial layer 142 and the second sacrificial layer 146 for a second portion of the transmission line 114. The first and second portions of the transmission line 114 are separated by the gap 118. A second layer of conductive material, such as gold, is preferably deposited using electron beam evaporation and liftoff to form the first and second portions of the transmission line 114, as shown in FIG. 4F.

The electrical contact 134 may then be formed. A third sacrificial layer 148 is deposited on top of the second sacrificial layer 146 and portions of the transmission line 114, as shown in FIG. 4G. A hole 135 is then preferably partially etched in the third sacrificial layer 148, as shown in FIG. 4H. A third layer of conductive material, such as gold, is preferably deposited using electron beam evaporation and liftoff to form the electrical contact 134, as shown in FIG. 4I.

The actuating portion 126 may then be formed. A hole 137 is etched through the first sacrificial layer 142, the second sacrificial layer 146, and the third sacrificial layer 148 to form the location for the cantilever anchor 128, as shown in FIG. 4J. A layer of polycrystalline silicon 136 is then deposited atop the sacrificial layers 142, 146, 148 to form the cantilever anchor 128 and the actuator arm 130, as shown in FIG. 4K. Preferably, the residual stresses in the polycrystalline silicon are used to control the extent of the upwards curl in the actuator arm 130 when the switch 124 is in the OFF-state. Process factors affecting the residual stresses in polycrystalline silicon during the deposition and release phases include the structure of the deposited layer (i.e., the degree of crystallinity), the texture of the layer, the thickness of the layer, the speed at which the layer deposition process occurs and the presence or absence of doping. Also, during the release phase, residual stresses in polycrystalline silicon are affected by time of exposure to release agents. By controlling these factors, the residual stresses in the polycrystalline silicon layer 136 may be affected.

The arm electrostatic plate 140 may then be formed. The second layer 132, comprising a metal, for example, aluminum, is deposited using electron beam evaporation and liftoff to form the arm electrostatic plate 140 on the actuator arm 130, as shown in FIG. 4L. As previously described, the arm electrostatic plate 140 is formed so that it is substantially above the substrate electrostatic plate 120 to maximize the electrostatic attraction between the two plates 120, 140.

Fabrication of the switch is completed by using chemical release methods known in the art to remove the sacrificial layers 142, 146, 148. FIG. 4M shows the switch 124 after the sacrificial layers 142, 146, 148 have been removed, but without the desired curl in the actuator arm 130. Removal of the sacrificial layers 142, 146, 148 should actually result in the actuator arm 130 curling upwards, as shown in FIG. 4N.

Figure 5A:
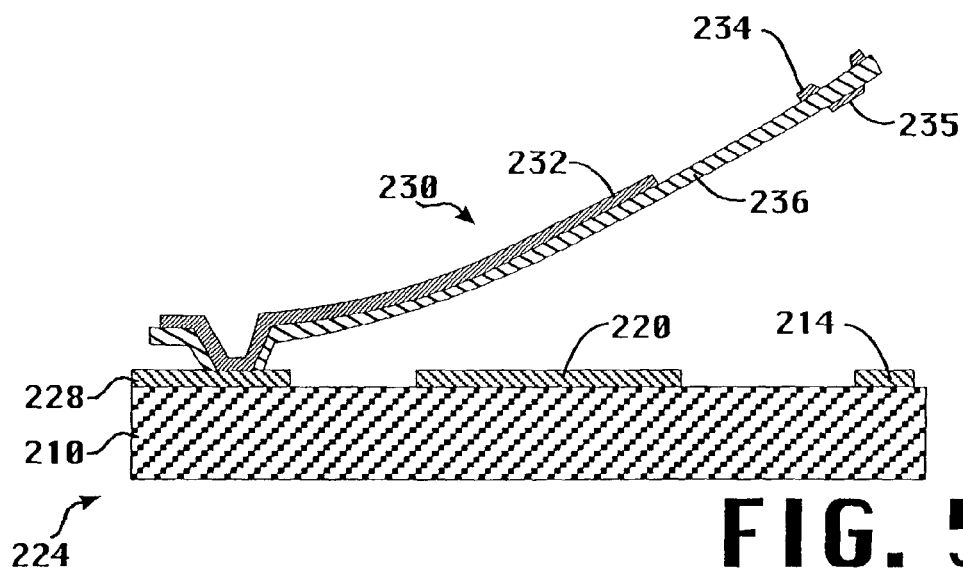
FIG. 5A is a side view of a second embodiment of an RF MEMS switch according to the present invention, showing the switch in the open position.
Figure 5B:
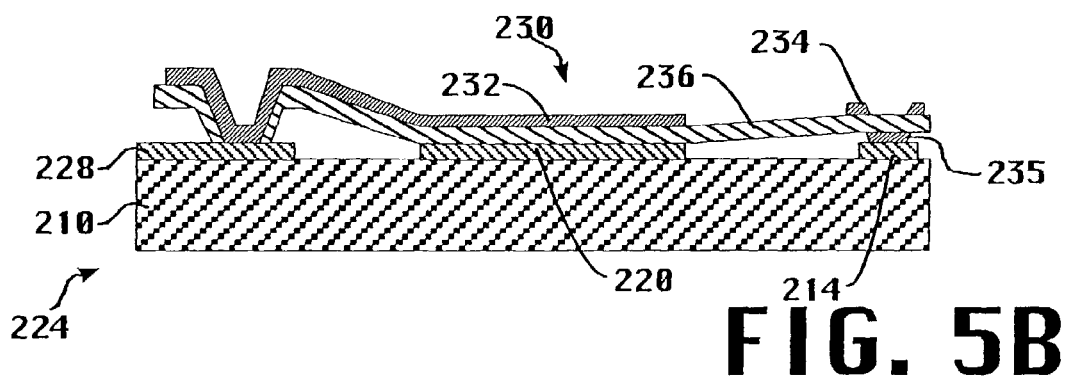
FIG. 5B is a side view of the switch of FIG. 5A, showing the switch in the closed position.
Figure 6:
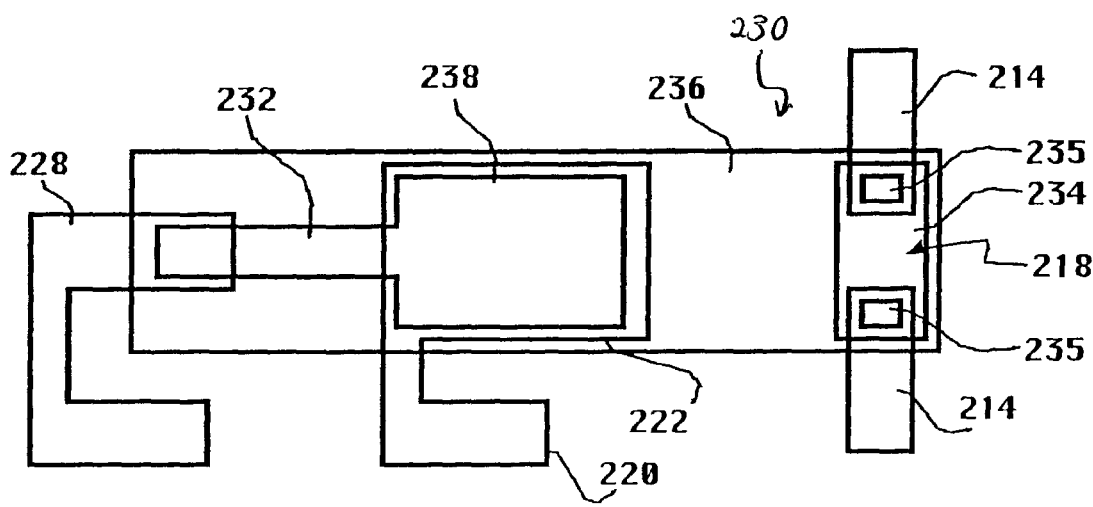
FIG. 6 is a plan view of the switch of FIGS. 5A and 5B, showing the general size, shape, and orientation of the various layers of the switch.

FIGS. 5A and 5B depict side views of an alternate embodiment of an RF MEMS switch 224 according to the present invention. In this embodiment, a cantilever actuator arm 230 comprises both a first arm structural layer 236 constructed of an insulating material and a second arm electrostatic plate layer 232 constructed of a conducting material. FIG. 5A depicts the RF MEMS switch 224 in the open or OFF-state. FIG. 5B depicts the RF MEMS switch 224 in the closed or ON-state. FIG. 6 is a top plan view of this embodiment that shows the orientation of the various elements of this embodiment, discussed in additional detail below.

The RF MEMS switch 224 is fabricated upon a substrate 210, preferably GaAs, although other materials may be used, such as InP, ceramics, quartz or silicon. The material for the substrate 210 is chosen primarily based on the technology of the circuitry the RF MEMS switch 224 is to be connected to so that the switch 224 and the circuitry may be fabricated simultaneously. For example, InP can be used for low noise HEMT MMICS (high electron mobility transistor monolithic microwave integrated circuits) and GaAs is typically used for PHEMT (pseudomorphic HEMT) power MMICS.

The switch 224 comprises a transmission line 214, a substrate electrostatic layer 220, and a cantilever actuator arm 230. The cantilever actuator arm 230 comprises the arm structural layer 236, the arm electrostatic plate layer 232, and a conducting transmission line 234 with at least one dimple 235 that preferably protrudes below the arm structural layer 236. FIG. 6 shows that the cantilever actuator 230 may have two dimples 235, while alternative embodiments may have more than two dimples 235 or a single dimple that is disposed beneath the length of the conducting transmission line 234. The arm electrostatic plate layer 232 connects to an arm plate layer contact 228 at the base of the cantilever actuator arm 230 to provide an electrical connection between the arm electrostatic plate layer 232 and the arm plate layer contact 228. The substrate electrostatic layer 220 contains a substrate electrostatic plate 222 located generally beneath the cantilever actuator arm 230. The arm electrostatic layer 232 contains an arm electrostatic plate 238 located generally above the substrate electrostatic plate 222. An application of a voltage between the arm electrostatic plate 238 and the substrate electrostatic plate 222 will cause the plates to be electrostatically attracted. When the plates 222, 238 are electrostatically attracted together, the switch 224 is in the closed position and the dimples 235 are in electrical contact with the transmission line 214. Since the dimples 235 are electrically connected together by the conducting transmission line 234, the electrical contact of the dimples 235 with the transmission line 214 bridges the gap 218 in the transmission line 214 when the switch 224 is in the closed position.

One possible method of fabricating switch 224 is discussed below. As previously discussed, an advantage of the present invention is that it can be manufactured using standard integrated circuit fabrication techniques. The switch 224 can also be fabricated on wafers that contain other integrated circuit devices. The flexibility in the fabrication of this and other embodiments of the present invention allows the present invention to be used in a variety of circuits. Note also that the same or similar materials for the layers and thicknesses for the layers discussed below may also be used in the fabrication of the switch 124 discussed above, along with the same or similar fabrication steps.

Figure 7A:
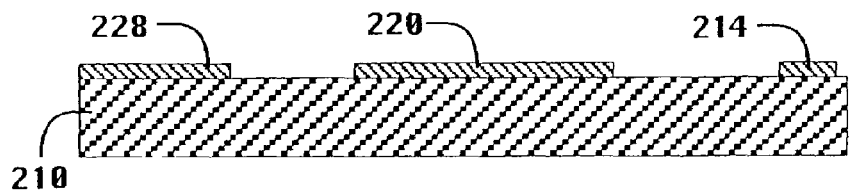
FIGS. 7A–F are side views of the switch of FIGS. 5A, 5B, and 6, illustrating the steps in fabricating the switch.

FIG. 7A shows a profile of the MEMS switch 224 after the first step of depositing a first metal layer onto the substrate 210 for the arm plate layer contact 228, the transmission line 214, and the substrate electrostatic layer 220 is complete. The first metal layer may be deposited lithographically using standard integrated circuit fabrication technology, such as resist lift-off or resist definition and metal etch. In the preferred embodiment, gold (Au) is used as the primary composition of the first metal layer. Au is preferred in RF applications because of its low resistivity. In order to ensure the adhesion of the Au to the substrate, a thin layer (preferably about 250–500 angstroms) of titanium (Ti) is deposited, followed by preferably about a 1000 angstrom layer of platinum (Pt), and finally the Au. The Pt acts as a diffusion barrier to keep the Au from intermixing with the Ti and causing the metal to lose adhesion strength to the substrate 210. In the case of a group III–V semiconductor substrate, a thin layer of gold germanium (AuGe) eutectic metal may be deposited first to ensure adhesion of the Au by alloying the AuGe into the semiconductor, similar to a standard ohmic metal process for any group III–V MESFET or HEMT.

Figure 7B:
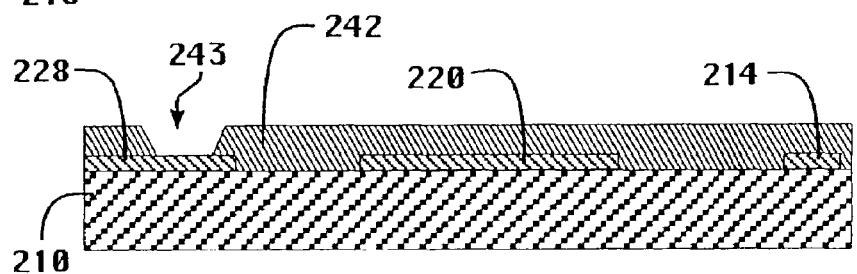
Figure 7C:
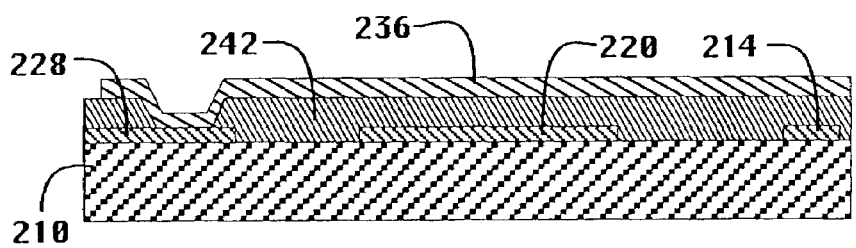

Next, as shown in FIG. 7B, a sacrificial layer 242 is placed on top of the first metal layer and etched so that the cantilever actuator arm 230 may be produced above the sacrificial layer 242. The sacrificial layer 242 is typically comprised of 2 microns of $SiO_2$ which may be sputter deposited or deposited using PECVD (plasma enhanced chemical vapor deposition). A via 243 is etched in the sacrificial layer 242 so that the metal of the arm plate layer contact 228 is exposed. The via 243 definition may be performed using standard resist lithography and etching of the sacrificial layer 242. Other materials besides $SiO_2$ may be used as a sacrificial layer 242. The important characteristics of the sacrificial layer 242 are a high etch rate, good thickness uniformity, and conformal coating by the layer 242 of the metal already on the substrate 210. The thickness of the layer 242 partially determines the initial thickness of the switch opening, before the arm 230 begins to curve away from the substrate 210 due to residual stresses. The sacrificial layer 242 will be removed in the final step to release the cantilever actuator arm 230, as shown in FIG. 7F.

Another advantage of using $SiO_2$ as the sacrificial layer 242 is that $SiO_2$ can withstand high temperatures. Other types of support layers, such as organic polyimides, harden considerably if exposed to high temperatures. This makes a polyimide sacrificial layer difficult to later remove. The sacrificial layer 242 is exposed to high temperatures when the preferred material of silicon nitride for the arm structural layer 236 is deposited (as shown in FIG. 7C), as a high temperature deposition is desired when depositing the silicon nitride to give the silicon nitride a lower buffered oxide etch (BOE) etch rate. A low BOE etch rate minimizes the amount of the arm structural layer 236 that is lost when the $SiO_2$ is etched away.

FIG. 7C shows the fabrication of the arm structural layer 236. The arm structural layer 236 is the supporting mechanism of the cantilever actuator arm 230 and is preferably made out of silicon nitride, although other materials besides silicon nitride may be used. The material used for the arm structural layer 236 should have a low etch rate compared to the sacrificial layer 242 so that the arm structural layer 236 is not etched away when the sacrificial layer 242 is removed to release the cantilever actuator arm 230. The arm structural layer 236 is patterned and etched using standard lithographic and etching processes.

The arm structural layer 236 is preferably formed below the arm electrostatic plate layer 232. Since the arm structural layer 230 is fabricated on only one side of the arm electrostatic plate layer 232, bowing will occur in the cantilever actuator arm 230 when the arm 230 is released if the residual stress in the arm structural layer 236 differs from the stress in the arm electrostatic plate layer 232. The materials in the arm structural layer 236 and the arm electrostatic plate layer 232 are chosen such that the differing stresses in the materials cause the arm 230 to bow upwards. The techniques used to deposit the arm electrostatic plate layer 232 also affect the amount of curvature achieved.

Figure 7D:
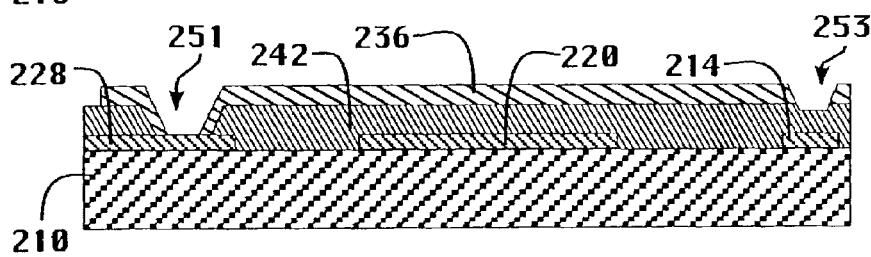

In FIG. 7D, a dimple receptacle 253 is etched into the arm structural layer 236 and the sacrificial layer 242. The dimple receptacle 253 is an opening where the dimple 235 will later be deposited. The dimple receptacle 253 is created using standard lithography and a dry etch of the arm structural layer 236, followed by a partial etch of the sacrificial layer 242. The opening in the sacrificial layer 242 allows the dimple 235 to preferably protrude through the sacrificial layer 242. Note that a plurality of dimple receptacles 253 may be formed to allow a plurality of dimples 235 to be used to form an electrical contact with the transmission line 214 when the switch 224 is in the closed position.

Next, a second metal layer is deposited onto the arm structural layer 236. The second metal layer forms the arm electrostatic plate layer 232, the conducting transmission line 234, and the dimple 235. In a preferred embodiment, the second metal layer is comprised of a sputter deposition of a thin film, preferably about 200 angstroms, of Ti, preferably followed by about a 1000 angstrom deposition of Au. The second metal layer must be conformal across the wafer and acts as a plating plane for the Au. The plating is done by using metal lithography to open up the areas of the switch that are to be plated. The Au may be electroplated by electrically contacting the membrane metal on the edge of the wafer and placing the metal patterned wafer in the plating solution. The plating occurs only where the membrane metal is exposed to the plating solution to complete the electrical circuit and not where the electrically insulating resist is left on the wafer. After about 2 microns of Au is plated, the resist is stripped off of the wafer and the whole surface is ion milled to remove the membrane metal. Some Au will also be removed from the top of the plated Au during the ion milling, but that loss is minimal because the membrane is preferably only 1200 angstroms thick.

Figure 7E:
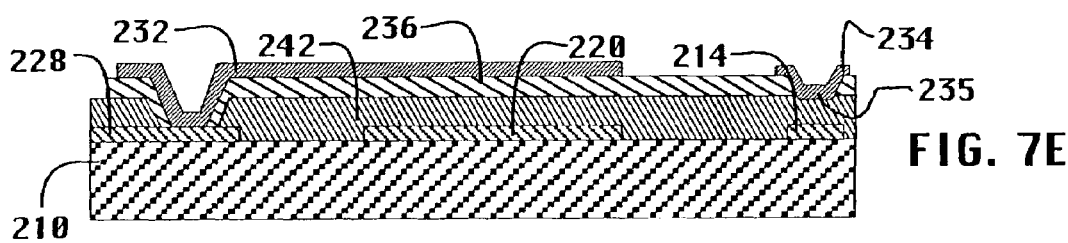
Figure 7F:
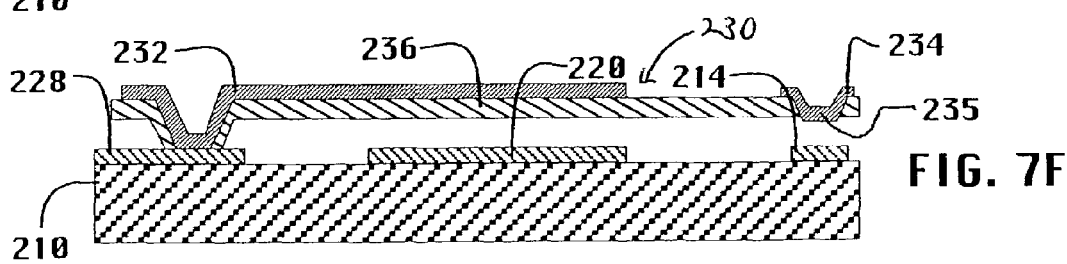

As shown in FIG. 7E, the result of this process is that the conducting transmission line 234 and the dimple 235 are created by the second metal layer, which comprises Au in a preferred embodiment. In addition, the Au fills the via 251 and connects the arm electrostatic plate layer 232 to the arm plate layer contact 228. Au is a preferred choice for the second metal layer because of its low resistivity. When choosing the metal for the arm electrostatic layer 232 and the material for the arm structural layer 236, it is important to select the materials such that the stress of the arm structural layer 236 varies from the stress of the arm electrostatic layer 232 so that the cantilever actuator arm 230 will bow upwards when the switch 224 is in the OFF-state. This is done by carefully determining the deposition parameters for the structural layer 236. Silicon nitride was chosen for this structural layer 236 not only for its insulating properties, but, in large part, because of the controllability of these deposition parameters and the resultant stress levels of the layer.

The arm structural layer 236 is then lithographically defined and etched to complete the switch fabrication. Finally, the sacrificial layer 242 is removed to release the cantilever actuator arm 230. If the sacrificial layer 242 is comprised of $SiO_2$, then it will typically be wet etched away in the final fabrication sequence by using a hydrofluoric acid (HF) solution. The etch and rinses are performed with post-processing in a critical point dryer to ensure that the cantilever actuator arm 230 does not come into contact with the substrate 210 when the sacrificial layer 242 is removed. If contact occurs during this process, device sticking and switch failure are probable. Note, however, that the bimorph character of the cantilever actuator arm 230 should cause the arm 230 to bow upwards and should also reduce the likelihood of contact with the substrate 210 upon removal of the sacrificial layer 242. Contact may be prevented by transferring the switch from a liquid phase (e.g. HF) environment to a gaseous phase (e.g. air) environment not directly, but by introducing a supercritical phase in between the liquid and gaseous phases. The sample is etched in HF and rinsed with de-ionized (DI) water by dilution, so that the switch is not removed from a liquid during the process. DI water is then replaced with methanol. The sample is transferred to the critical point dryer and the chamber is sealed. High pressure liquid $CO_2$ replaces the methanol in the chamber, so that there is only $CO_2$ surrounding the sample. The chamber is heated so that the $CO_2$ changes into the supercritical phase. Pressure is then released so that the $CO_2$ changes into the gaseous phase. Now that the sample is surrounded only by gas, it may be removed from the chamber into room air. A side elevational view of the MEMS switch 224 after the support layer 242 has been removed, but before the cantilever actuator arm 230 curls upwards, is shown in FIG. 7F.

Figure 8:
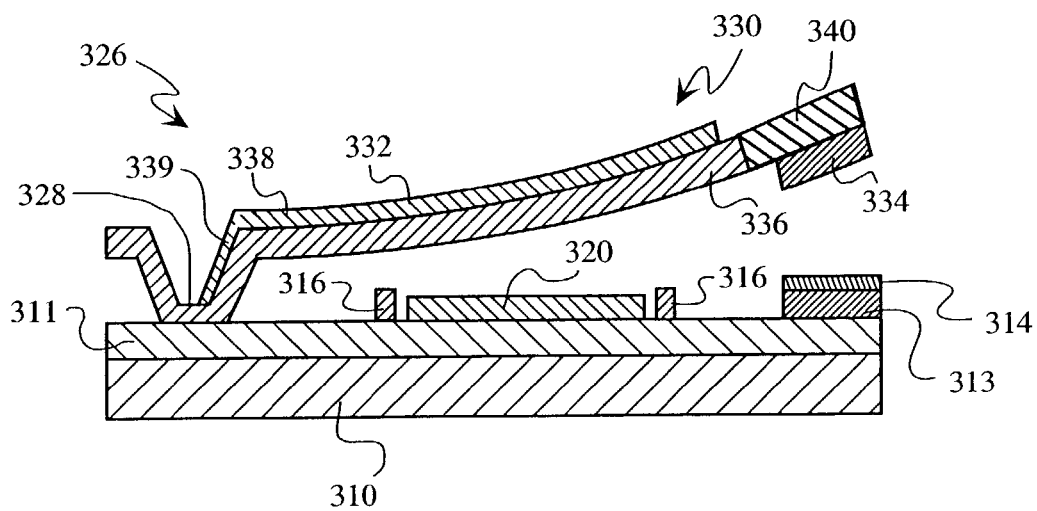
FIG. 8 is a side view of a third embodiment of an RF MEMS switch according to the present invention, showing the switch in the open position.
Figure 9:
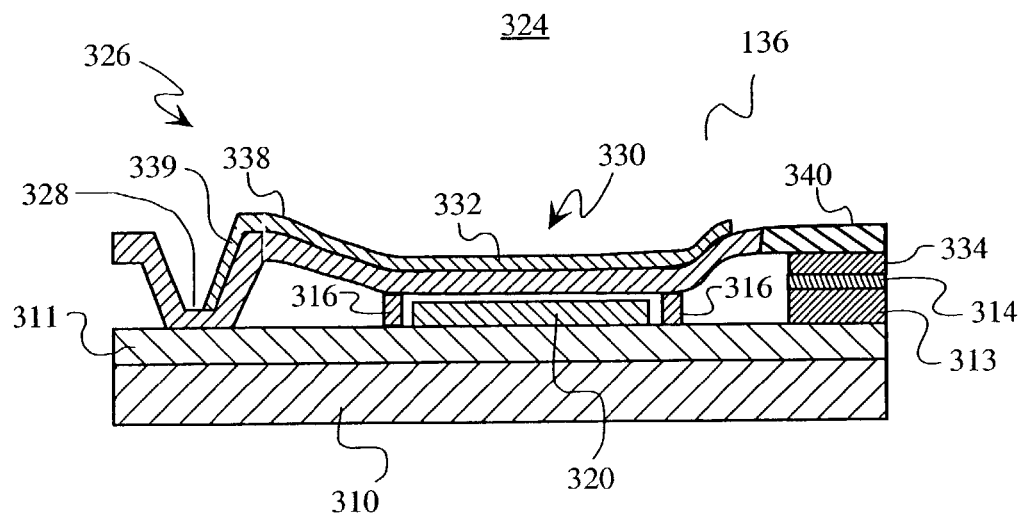
FIG. 9 is a side view of the switch of FIG. 8, showing the switch in the closed position.

FIGS. 8 and 9 depict views of another embodiment of an RF MEMS switch 324 according to the present invention. In this embodiment, an insulating layer 340 electrically isolates a conducting transmission line 334 from an arm structural layer 336 and an arm electrostatic plate 332. FIG. 8 depicts the RF MEMS switch 324 in the open or OFF-state. FIG. 9 depicts the RF MEMS switch 324 in the closed or ON-state.

The switch 324 comprises a transmission line 314, a substrate electrostatic plate 320, and a cantilever 326. The switch 324 is fabricated upon a substrate 310, preferably comprising GaAs, although other materials may be used, such as InP, ceramics, quartz or silicon. The substrate 310 may also be coated with an insulating layer 311 comprising, for example, silicon nitride. The cantilever 326 comprises a cantilever anchor 328 fabricated on the substrate 310 and a cantilever actuator arm 330. The cantilever actuator arm 330 comprises the arm structural layer 336, the arm electrostatic plate 332, an insulating layer 340, and the conducting transmission line 334. Preferably, the cantilever anchor 328 also is integral with the arm structural layer 336.

The substrate electrostatic plate 320 is formed on the substrate 310 and is located generally beneath the arm electrostatic plate 332 on the cantilever actuator arm 330. An application of a voltage between the arm electrostatic plate 332 and the substrate electrostatic plate 320 will cause the plates 320, 332 to be electrostatically attracted. Preferably, mechanical stops 316 are formed on the substrate that are electrically isolated from the substrate electrostatic plate 320 and have a greater height than the substrate electrostatic plate 320. The mechanical stops 316 prevent the cantilever actuator arm 330 from coming into electrical contact with the substrate electrostatic plate 320. An insulating, semi-conducting, or conducting layer 313 may be located beneath the transmission line 314 to isolate the transmission line from the substrate 310 or to decrease the amount of deflection required for the conducting transmission line 334 to contact the transmission line 314.

One possible method of fabricating switch 324 is discussed below. This embodiment of the present invention is particularly adapted for fabrication by using standard three-polysilicon-layer surface-micromachining processes, such as that provided by the Multi-User MEMS Processes (MUMPs™) from Cronos Integrated Microsystems of Research Triangle Park, N.C. However, other methods of micromachining fabrication may be used.

FIG. 10A shows a cross-section of an embodiment of the switch 324 at the beginning of the fabrication process. The surface of the starting n-type silicon substrate 310 is heavily doped with phosphorus in a standard diffusion furnace using $POCl_3$ as the dopant source. Preferably, a blanket layer 311, about 0.5 μm thick, of low stress silicon nitride is deposited on the substrate 310 as an insulating layer. Then, preferably, a polysilicon layer 320 (POLY0), about 0.5 μm-thick, is deposited for providing the conducting surfaces for the substrate electrostatic plate 322 and the conducting layer 313 for the gapped transmission line 314. The wafer is then coated with an ultraviolet-sensitive photoresist layer 390.

The photoresist layer 390 is lithographically patterned by exposing it to ultraviolet light through a first level mask and then developing it. The photoresist layer 390 in exposed areas is removed leaving behind a patterned photoresist mask for etching, as shown in FIG. 10B. Reactive Ion Etching (RIE) is used to remove any unwanted polysilicon. After the etch, the photoresist is chemically stripped in a solvent bath. This method of patterning the wafers with photoresist, etching and stripping the remaining photoresist is also used to remove unwanted portions of the additional polysilicon layers described below.

After the unwanted polysilicon is removed from the POLY0 layer 320 and the photoresist is removed, the conducting surfaces for the substrate electrostatic plate 322 and the conducting layer 313 remain, as shown in FIG. 10C. A blanket layer 371, approximately 2.0 μm thick, of phosphosilicate glass (PSG) is deposited on the structure by low pressure chemical vapor deposition (LPCVD). The deposit of this first sacrificial layer 371 is shown in FIG. 10D. Other materials such as $SiO_2$ may also be used for the sacrificial layer 371.

The structure is then coated with photoresist and the areas 381 for the mechanical stops 316 are lithographically patterned. These areas, which reach the nitride layer 311, are reactive ion etched into the first sacrificial layer 371. After the etch, the photoresist is stripped. The structure after removal of the photoresist is shown in FIG. 10E.

A second layer 317 (POLY1), approximately 2.0 μm thick, of un-doped polysilicon is deposited by LPCVD. This layer serves to fill in the mechanical stop areas 381. The results of this step are shown in FIG. 10F. The POLY1 layer 317 is again coated with photoresist, patterned, and etched. The result is to remove the bulk of the POLY1 layer 317 on top of the sacrificial layer 371, as shown in FIG. 10G. A second sacrificial layer 372, preferably comprising PSG, is then deposited on top of the structure, as shown in FIG. 10H.

The structure is again coated with photoresist and the anchor area 329 for the cantilever anchor 328 is etched into both the second sacrificial layer 372 and first sacrificial layer 371 down to the nitride layer 311, as shown in FIG. 10I. A third polysilicon layer 336 (POLY2) is then deposited onto the structure by LPCVD, as shown in FIG. 10J. The POLY2 layer 336 provides the cantilever arm structural layer 336 and the cantilever anchor 328.

The POLY2 layer 336 is then etched to provide access to the area 341 to be used for the gapped transmission line 314, as shown in FIG. 10K. An additional mask and etch process is used to remove portions of the first sacrificial layer 371 and the second sacrificial layer 372 to expose the conducting layer 313, as shown in FIG. 10L. The structure is then coated with photoresist and a metal layer is lithographically patterned for the arm electrostatic plate 332 and the gapped transmission line 314. The metal layer, preferably gold with a thin adhesion layer, is deposited by lift-off patterning. The photoresist and any unwanted metal are then removed in a solvent bath. The structure after removal of unwanted metal is shown in FIG. 10M.

A third sacrificial layer 373, also preferably comprising PSG, is then provided over portions of the arm electrostatic plate 332, the arm structural layer 336, the gapped transmission line 314, the first sacrificial layer 371 and the second sacrificial layer 372, as shown in FIG. 10N. The third sacrificial layer 373 is then etched to provide an area 335 for the conducting transmission line 334. Metal, again preferably gold with a thin adhesion layer, is deposited to create the conducting transmission line 334 and then any unwanted portions of metal are removed. The structure after creation of the conducting transmission line is shown in FIG. 10O.

Additional portions of the third sacrificial layer 373 are then removed to provide for mechanically coupling the conducting transmission line 334 to the arm structural layer 336. The structure after removal of portions of the third sacrificial layer is shown in FIG. 10P. An insulating material layer 340, such as silicon nitride, is deposited on top of the conducting transmission line 334 and proximate to the arm structural layer 336. The insulating material layer 340 essentially causes the conducting transmission line 334 to be fixedly attached to the arm structural layer 336, as shown in FIG. 10Q. Portions of the insulating material layer 340 may be removed as shown in FIG. 10R. The removal of portions of the insulating material layer 340 may be done to decrease the weight of the cantilever actuator arm 330 and to allow the cantilever actuator arm 330 to curl upwards as desired.

Finally, the cantilever actuator arm 330 is released by removing the sacrificial layers 371, 372, 373. The release may be performed by immersing the structure in a bath of 49% hydrofluoric acid at room temperature for 1.5 to 2 minutes. Other methods known in the art may also be used to remove the sacrificial layers 371, 372, 373. This is followed by several minutes in DI water and then alcohol to reduce the likelihood of stiction. Finally, the structure is placed in an oven at 1100° C. for at least 10 minutes. The structure after removal of the sacrificial material is shown in FIG. 10S. Note that due to the bimorph character of the switch, the cantilever actuator arm 330 should curl upwards as shown in FIG. 10T.

Although the present invention has been described with respect to specific embodiments thereof, various changes and modifications can be carried out by those skilled in the art without departing from the scope of the invention. In particular, the substrate, cantilever anchor, cantilever arm, electrostatic plates, and metal contacts may be fabricated using any of various materials appropriate for a given end use design. The cantilever anchor, cantilever arm, electrostatic plates, and metal contacts may be formed in various configurations, including multiple anchor points, cantilever arms, and metal contacts. It is intended, therefore, that the present invention encompass such changes and modifications as fall within the scope of the appended claims.

What is claimed is:

1. An electromechanical switch comprising:
   a substrate;
   a first electrical contact formed on said substrate;
   a substrate electrostatic plate formed on said substrate;
   a cantilever actuator arm anchored to said substrate at a first end of said actuator arm, said actuator arm physically contacting said substrate electrostatic plate when said switch is in a closed position;
   a second electrical contact disposed at a second end of said actuator arm, said second electrical contact being in electrical contact with said first electrical contact when said switch is in said closed position; said substrate electrostatic plate disposed beneath said actuator arm and between said first end and said second end of said actuator arm; and
   an arm electrostatic plate formed on said actuator arm and positioned above said substrate electrostatic plate when said switch is in a closed position,
   wherein when said switch is in an open position, said actuator arm curves away from said substrate.

2. The switch of claim 1, wherein said first electrical contact has a gap that is closed by the second electrical contact when the switch is in a closed position.

3. The switch of claim 1, wherein said actuator arm comprises polycrystalline silicon.

4. The switch of claim 1, wherein said actuator arm is fabricated such that said actuator arm curves away from said substrate due to nonuniform stresses in said actuator arm.

5. A method of switching electrical energy between an input and an output, the method comprising the steps of:
   providing an electrostatically actuated cantilevered arm on a substrate, said cantilevered arm comprising an arm electrostatic plate and said substrate comprising a substrate electrostatic plate;
   applying a voltage to attract said electrostatically actuated cantilevered arm towards said substrate, said cantilevered arm having an electrical contact that electrically connects said input to said output when the voltage is applied, said arm electrostatic plate being positioned above said substrate electrostatic plate when the voltage is applied, said cantilevered arm physically contacting said substrate electrostatic plate when said voltage is applied; and
   removing said voltage or applying a second voltage to cause said cantilevered arm to move away from said substrate, said electrical contact no longer electrically connecting said input to said output when the voltage is removed or the second voltage is applied,
   wherein said cantilevered arm curves away from said substrate when the voltage is removed or the second voltage is applied.

6. The method of claim 5, wherein said cantilevered arm curves away from said substrate due to nonuniform stresses in said cantilevered arm.

7. The method of claim 5, wherein said electrical contact comprises two or more dimples projecting through said cantilevered arm, said two or more dimples being electrically connected together.

8. A micro-electromechanical switch formed on a substrate, said switch comprising:
   a transmission line formed on said substrate, said transmission line having a transmission line gap forming an open circuit;
   a substrate electrostatic plate formed on said substrate; and
   an actuating portion, said actuating portion comprising:
      a cantilever anchor formed on said substrate;
      a cantilevered actuator arm extending from said cantilever anchor, said actuator arm physically contacting said substrate electrostatic plate when said switch is in a closed position;
      an electrical contact formed on said actuator arm and positioned facing said gap in said transmission line; and
      an arm electrostatic plate formed on said actuator arm, said arm electrostatic plate having a first portion formed proximate said cantilever anchor and a second portion extending from said first portion along said actuator arm, wherein when said switch is in an open position, said actuator arm has a bend such that a minimum separation distance between said transmission line and said electrical contact is equal to or greater than a maximum separation distance between said substrate electrostatic plate and said arm electrostatic plate, said arm electrostatic plate and a segment of said actuator arm on which said arm electrostatic plate is formed defining a structure electrostatically attractable toward said substrate electrostatic plate upon selective application of a voltage to said arm electrostatic plate.

9. The micro-electromechanical switch of claim 8, wherein the electrostatic attraction of said electrostatically attractable structure toward said substrate electrostatic plate causes said electrical contact on said actuator arm to bridge said transmission line gap.

10. The micro-electromechanical switch of claim 8, wherein said substrate comprises a semi-insulating substrate.

11. The micro-electromechanical switch of claim 10, wherein said semi-insulating substrate comprises gallium arsenide (GaAs).

12. The micro-electromechanical switch of claim 8, wherein said actuator arm comprises polycrystalline silicon.

13. The micro-electromechanical switch of claim 8 wherein said bend in said actuator arm is produced by inducing a nonuniform level of residual stress in said arm electrostatic plate formed on said actuator arm.

14. The micro-electromechanical switch of claim 8 wherein said bend in said actuator arm is produced by inducing a nonuniform level of residual stress in said actuator arm.

15. The micro-electromechanical switch of claim 8, wherein said substrate electrostatic plate and said transmission line comprise gold microstrips on said substrate.

16. The micro-electromechanical switch of claim 8, wherein said electrical contact comprises a metal selected from the group consisting of gold, platinum, and gold palladium.

17. The switch of claim 1, wherein after an actuating voltage is applied, said actuator arm closes against said substrate electrostatic plate in a continuous manner wherein portions of said actuator arm closest to said first end of said actuator arm close against said substrate electrostatic plate before portions of said actuator arm closest to said second end of said actuator arm close against said substrate electrostatic plate.

18. The method of claim 5, wherein after applying the voltage to attract said cantilevered arm towards said substrate, said cantilevered arm closes against said substrate electrostatic plate in a continuous manner wherein portions of said cantilevered arm closest to a first end of said cantilevered arm close against said substrate electrostatic plate before portions of said cantilevered arm closest to a second end of said cantilevered arm close against said substrate electrostatic plate.

19. The micro-electromechanical switch of claim 8, wherein after an actuating voltage is applied, said actuator arm closes against said substrate electrostatic plate in a continuous manner wherein portions of said actuator arm closest to a first end of said actuator arm close against said substrate electrostatic plate before portions of said actuator arm closest to a second end of said actuator arm close against said substrate electrostatic plate.

20. The switch of claim 1, wherein when said switch is in said closed position said cantilever actuator arm has a plurality of bends.

21. The method of claim 5, wherein when said voltage is applied said cantilevered arm has a plurality of bends.

22. The micro-electromechanical switch of claim 8, wherein when said switch is in a closed position said actuator arm has a plurality of bends.

23. An electromechanical switch comprising:
a substrate;
a first electrical contact formed on said substrate;
a substrate electrostatic plate formed on said substrate and comprising a first side and a second side opposite to the first side;
a cantilever actuator arm anchored to said substrate at a first end of said actuator arm;
a mechanical post disposed adjacent said first side or said second side of the substrate electrostatic plate so as to prevent said actuator arm from physically contacting said substrate electrostatic plate when said switch is in a closed position;
a second electrical contact disposed at a second end of said actuator arm, said second electrical contact being in electrical contact with said first electrical contact when said switch is in said closed position; said substrate electrostatic plate disposed beneath said actuator arm and between said first end and said second end of said actuator arm; and
an arm electrostatic plate formed on said actuator arm and positioned above said substrate electrostatic plate when said switch is in a closed position,
wherein when said switch is in an open position, said actuator arm curves away from said substrate.

* * * * *